United States Patent
Fried et al.

(10) Patent No.: US 7,052,233 B2
(45) Date of Patent: May 30, 2006

(54) BASE MATERIAL WITH COOLING AIR HOLE

(75) Inventors: Reinhard Fried, Nussbaumen (CH); Ulrich Rathmann, Baden (CH)

(73) Assignee: Alstom Switzerland LTD, Baden (CH)

( * ) Notice: Subject to any disclaimer, the term of this patent is extended or adjusted under 35 U.S.C. 154(b) by 0 days.

(21) Appl. No.: 10/899,031

(22) Filed: Jul. 27, 2004

(65) Prior Publication Data

US 2005/0084371 A1   Apr. 21, 2005

Related U.S. Application Data

(63) Continuation of application No. 10/183,853, filed on Jun. 28, 2002, now abandoned.

(30) Foreign Application Priority Data

Jul. 13, 2001   (CH) .................................... 1291/01

(51) Int. Cl.
*F04D 29/70*   (2006.01)

(52) U.S. Cl. .................. 415/121.2; 416/97 A

(58) Field of Classification Search ............ 415/121.1, 415/121.2; 416/96 A, 96 R, 97 R, 97 A, 416/229 R See application file for complete search history.

(56) References Cited

U.S. PATENT DOCUMENTS

| | | | |
|---|---|---|---|
| 3,011,760 A | 12/1961 | Eckert | |
| 3,066,912 A | 12/1962 | Scheper, Jr. | |
| 3,584,972 A | 6/1971 | Bratkovich et al. | |
| 3,623,711 A | 11/1971 | Thorstenson | |
| 3,672,787 A | 6/1972 | Thorstenson | |
| 4,040,767 A | 8/1977 | Dierberger et al. | |
| 4,135,855 A | 1/1979 | Peill | |
| 4,173,458 A | 11/1979 | Stiles | |
| 4,192,138 A | 3/1980 | Szema | |
| 4,221,539 A | 9/1980 | Corrigan | |
| 4,269,032 A | 5/1981 | Meginnis et al. | |
| 4,302,940 A * | 12/1981 | Meginnis ...................... | 60/754 |
| 4,606,701 A | 8/1986 | McClay et al. | |
| 4,705,455 A | 11/1987 | Sahm et al. | |
| 5,113,648 A | 5/1992 | Shekleton et al. | |
| 5,183,385 A | 2/1993 | Lee et al. | |
| 5,192,192 A | 3/1993 | Ourhaan | |
| 5,747,769 A | 5/1998 | Rockstroh et al. | |
| 5,779,437 A | 7/1998 | Abdel-Messeh et al. | |

(Continued)

FOREIGN PATENT DOCUMENTS

DE              2042947              6/1971

(Continued)

OTHER PUBLICATIONS

*European Search Report dated Jun. 16, 2005.

*Primary Examiner*—Edward K. Look
*Assistant Examiner*—Dwayne J White
(74) *Attorney, Agent, or Firm*—Buchanan Ingersoll PC

(57) ABSTRACT

A base material (2) with a cooling air hole (1) is disclosed, means being present which prevent particles (5), which are located in the cooling air (4) which flows through the cooling air hole (1) during the operation of the cooling air hole (1), from closing the cooling air hole (1). In this arrangement, the means can consist in the edge of the cooling air hole (1) being uneven or having a ridge (3) or the cooling air hole (1) being star-shaped, ellipsoidal or linear or the cooling air hole (1) being circular and having lateral slots (7).

19 Claims, 3 Drawing Sheets

U.S. PATENT DOCUMENTS

Figure 1:
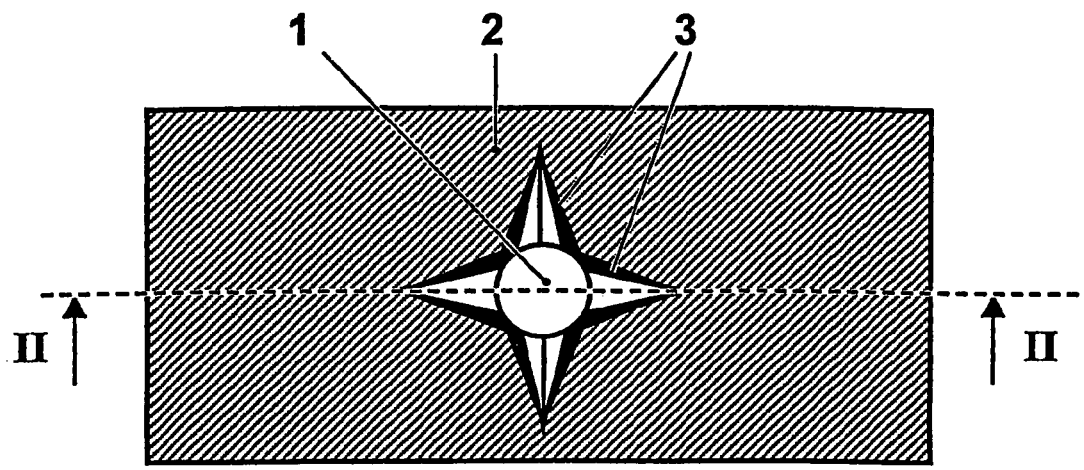

| | | |
|---|---|---|
| 5,941,686 A | 8/1999 | Gupta et al. |
| 5,983,623 A | 11/1999 | Aoki et al. |
| 6,120,249 A | 9/2000 | Hultgren et al. |

FOREIGN PATENT DOCUMENTS

| | | |
|---|---|---|
| DE | 2514704 | 11/1975 |
| DE | 3532168 A1 | 3/1986 |
| DE | 4422965 A1 | 1/1996 |
| EP | 0340149 A1 | 11/1989 |
| EP | 0365195 A2 | 4/1990 |
| EP | 0534207 A1 | 3/1993 |
| EP | 937863 A2 * | 8/1999 |
| EP | 0965728 A2 | 12/1999 |
| EP | 1 059 418 A2 | 12/2000 |
| EP | 1059418 A2 | 12/2000 |
| EP | 1072757 A1 | 1/2001 |
| GB | 1285369 | 8/1972 |
| GB | 2342124 A | 4/2000 |
| WO | 99/36675 | 7/1999 |

* cited by examiner

BASE MATERIAL WITH COOLING AIR HOLE

TECHNICAL FIELD

The invention relates to a base material with a cooling air hole. The base material is, in particular, a gas turbine part in which cooling air holes are present.

PRIOR ART

The documents U.S. Pat. Nos. 5,192,192, 4,075,455, 5,779,437, 4,606,701 or 5,183,385 generally show air-cooled turbine blades, in which cooling air flows through cooling air holes arranged at various locations. The shape of the cooling air holes is designed to correspond to their position and their function. In these examples, film cooling holes are involved which form a film on a surface of a component and, by this means, cool the basic component.

In addition, various blading arrangements with cooling devices have become known from the publications DE-OS-2 042 947, EP-A1-0 534 207, WO99/36675, U.S. Pat. Nos. 6,120,249 or 4,040,767. In contrast to the publications mentioned above, however, impingement cooling is involved in this case. Cooling air flows through cooling air holes of an impingement panel onto a turbine blading platform located at a distance under them.

One problem in the cooling system of such turbine blading consists in the fact that the cooling air contains dirt or dust particles. Whereas smaller particles can flow unhindered without further problems through the cooling air holes, which can, for example, have a diameter of between 0.5 and 1 mm, larger particles close the cooling air holes so that the cooling performance is reduced overall and there is the threat of overheating of the component.

The publication EP-A1-1 072 757 therefore proposes a dust-resistant, internal cooling system for turbine blading.

The publications U.S. Pat. Nos. 3,066,912, 5,983,623, GB-A-2,342,142, DE-A1-44 22 965, DE-A1-35 32 168, DE-AS-25 14 704 or U.S. Pat. No. 4,173,458 solve the problem mentioned above by means of cyclones. The polluted air is fed through the cyclone, the ash is separated, and the cleaned air is subsequently further used at a suitable location.

The measures proposed for separating cooling air and dust are, however, extremely complex.

PRESENTATION OF THE INVENTION

The invention achieves the object of creating a base material with cooling air holes which are no longer completely closed by particles which are present in the cooling air. In particular, the base material is an impingement panel of a turbine blading platform.

According to the invention, this is achieved in the case of a base material with a cooling air hole according to the preamble to claim 1 by means which prevent the particles closing the cooling air hole being present at the cooling air hole.

Although the particles which pollute the cooling air are located above the cooling air hole, the particles no longer close the latter, so that a certain cooling performance is advantageously always maintained by cooling air which flows past the particles and through the cooling air hole. In addition, there is a greater probability of the particles being removed from this position again by vibrations or flow fluctuations in the cooling air.

In what follows, the means can consist of the edge of the cooling air hole being uneven or having a ridge. This ridge can appear due to punching or stamping of the cooling air hole or can have already appeared during a casting process of the base material.

The possibility also exists of arranging a protuberance, a wire mesh or another type of filter over the cooling air hole. It is also conceivable for the means to consist of a star-shaped, ellipsoidal or linear cooling air hole or of a circular cooling hole with lateral slots, it being possible to manufacture the cooling air holes by means of a laser, water jet or electrode jet.

In an exemplary embodiment, the base material can be a part of a gas turbine, for example a sheet-metal part, for example therefore an impingement plate of a rotor blade platform or, generally, a cast part to be cooled.

SHORT DESCRIPTION OF THE DRAWINGS

Figure 2:
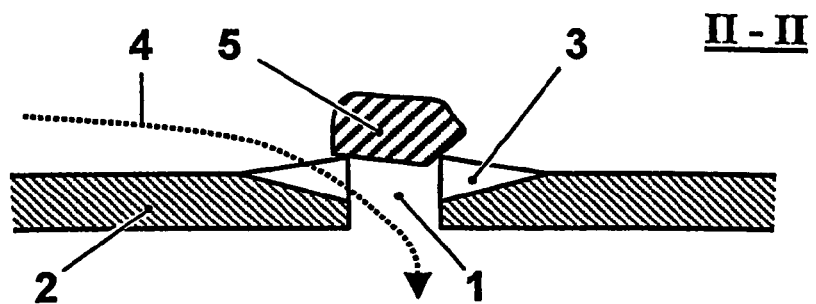
Figure 3:
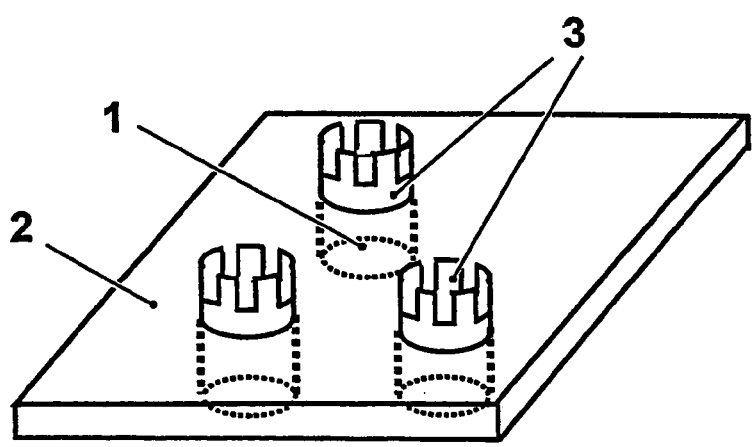
Figure 4:
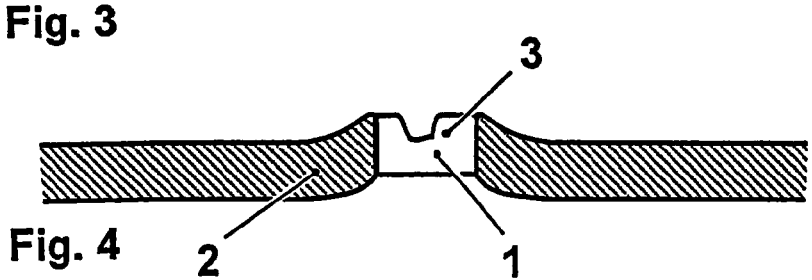
Figure 5:
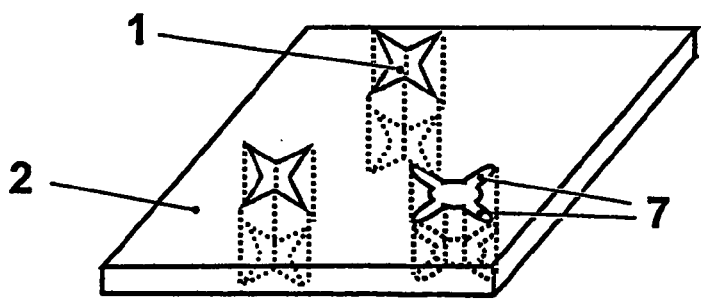
Figure 6:
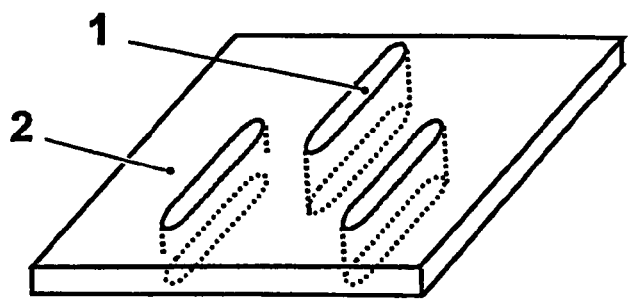
Figure 7:
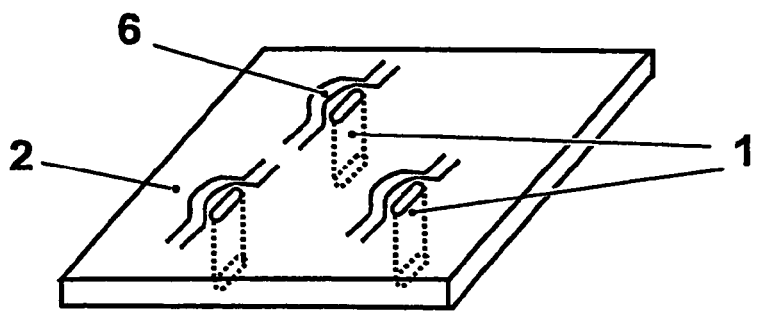
Figure 8:
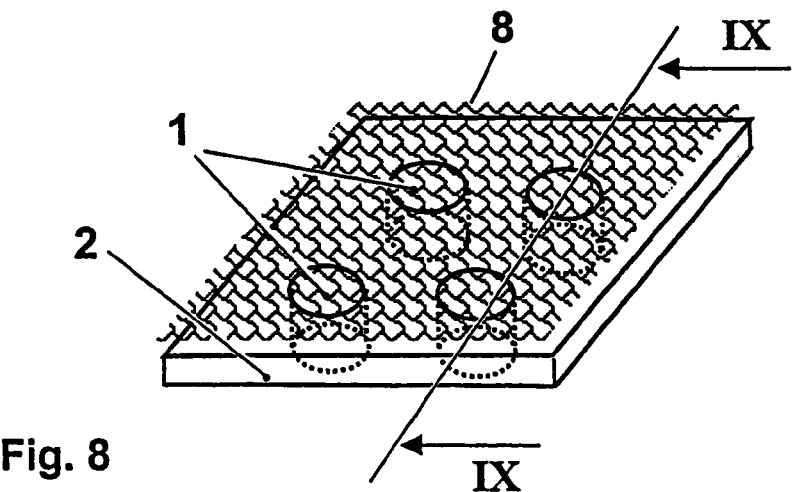
Figure 9:
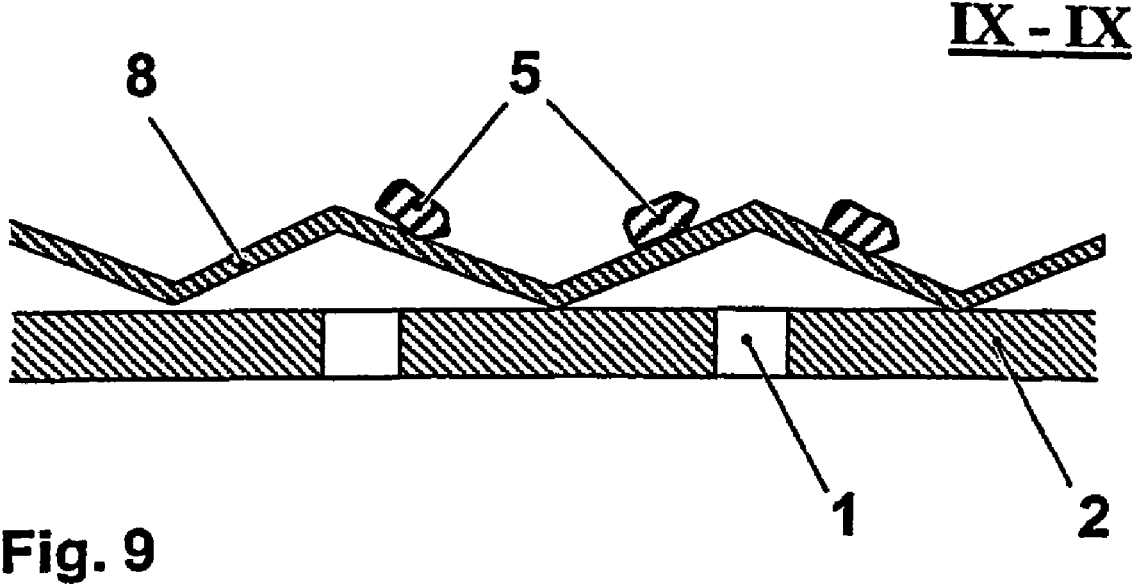

The invention is explained in more detail below using the enclosed figures, in which FIG. 1 shows a base material with a cooling air hole according to the invention in a first embodiment, FIG. 2 represents the section along the line II—II in FIG. 1, FIG. 3 shows a base material with cooling air holes according to the invention in a second embodiment, FIG. 4 shows a section through a punched cooling air hole according to the invention in a third embodiment, FIG. 5 shows a base material with cooling air holes according to the invention in a fourth embodiment, FIG. 6 shows a base material with cooling air holes according to the invention in a fifth embodiment, FIG. 7 shows a base material with cooling air holes according to the invention in a sixth embodiment, FIG. 8 shows a base material with cooling air holes according to the invention in a seventh embodiment, and FIG. 9 shows the section along the line IX—IX in FIG. 8.

Only the features essential to the invention are represented. Similar elements have the same designations in different figures. Flow directions are designated by arrows.

WAY OF CARRYING OUT THE INVENTION

FIGS. 1 and 2 show a first embodiment of a base material 2 according to the invention with a cooling air hole 1, FIG. 2 showing the section II—II in FIG. 1. In this exemplary embodiment, a ridge 3 in the form of a star is stamped on the base material 2. Although particles 5, which pollute cooling air 4 which flows through the cooling air holes 1 during the operation of the basic component, are located above the cooling air hole 1, they can, advantageously, no longer close this cooling air hole 1. As may be seen from FIG. 2, a certain cooling performance is always maintained due to cooling air 4 which flows past the particles 5 and through the cooling air hole 1. In addition, there is, advantageously, a high probability that the particles 5 may be removed again from this position due to vibrations or flow fluctuations in the cooling air 4 and may free the cooling air hole 1.

In FIG. 3, a "crown" is integrally cast into the base material 2 which is, for example, a gas turbine casting which is to be cooled. The "crown" has already been integrally cast into the part at the edge of the cooling air hole 1 during the manufacture of the base material 2.

In FIG. 4, a ridge 3 appears due to punching during the manufacture of the cooling air holes 1. This is, for example, conceivable in the case of impingement panels of gas turbines which contain the cooling air holes 1.

According to the invention, all means, which generate a ridge 3 or an uneven edge at the cooling air hole 1, are appropriate for the exemplary embodiments of FIGS. 1 to 4, so that cooling air 4 continues to flow past the particles 5, which are located on the cooling air hole 1, and through the cooling air hole 1 and a certain cooling performance is maintained. The probability that the particles 5 will again leave their position is, furthermore, greater.

FIGS. 5 to 8 show further exemplary embodiments, according to the invention, of a base material 2 with cooling air holes 1.

Corresponding to FIGS. 5 and 6, it is conceivable for the cooling air hole 1 not to be circular. It can, in principle, be star-shaped, ellipsoidal or linear or consist of a circular cooling air hole 1 with lateral slots 7. In the last-mentioned example, the circular cooling air hole 1 will have a diameter known from the prior art. In consequence, particles 5 which would normally close the cooling air hole 1, so that it loses its function, are no longer able to close the cooling air hole 1 completely. The cooling air 4 continues to flow at the free ends of the cooling air hole 1. Such cooling air holes 1 can, for example, be cut with a laser, a water jet or an electrode beam.

The possibility also exists of arranging, over the cooling air hole 1, a stirrup 6 (FIG. 7) in the form of a protuberance or a "roof" or a wire mesh 8 (FIG. 8) or another type of filter. These prevent the particles 5 from covering the cooling air holes 1. Corresponding to FIG. 9, which shows the section IX—IX of FIG. 8, the wire mesh 8 can be arranged in a corrugation over the cooling air holes 1, so that it is fastened to the base material 2 between the cooling air holes 1 and a certain gap appears above the cooling air holes 1.

In an exemplary embodiment, the base material can be a part of a gas turbine, for example a sheet-metal part, therefore for example an impingement plate of a platform of a rotor blade, or a cast part to be cooled.

LIST OF DESIGNATIONS

1 Cooling air hole
2 Base material, impingement plate
3 Ridge
4 Cooling air
5 Particle
6 Stirrup
7 Slot
8 Wire mesh

What is claimed is:

1. A base material with a cooling air hole, through which cooling air laded with particles flows during the operation of the cooling air hole, wherein means which prevent the particles closing the cooling air holes are present at the cooling air hole wherein the means includes a stirrup which is located above the cooling air hole, said stirrup extending continuously and having no apertures.

2. The base material as claimed in claim 1, wherein the base material is a part of a gas turbine.

3. The base material as claimed in claim 2, wherein the part of the gas turbine is a cast part or a sheet-metal part.

4. A base material with a cooling air hole, through which cooling air laded with particles flows during the operation of the cooling air hole, wherein means which prevent the particles closing the cooling air holes are present at the cooling air hole, wherein the means includes a wire mesh which is located above the cooling air hole.

5. The base material as claimed in claim 4, wherein the wire mesh is arranged as a corrugation above the cooling air hole, so that it is fastened to the base material adjacent to the cooling air hole and a certain distance exists between wire mesh and cooling air hole.

6. The base material as claimed in claim 4, wherein the base material is a part of a gas turbine.

7. The base material as claimed in claim 6, wherein the part of the gas turbine is a cast part or a sheet-metal part.

8. A base material with a cooling air hole, through which cooling air laded with particles flows during the operation of the cooling air hole, wherein means which prevent the particles closing the cooling air holes are present at the cooling air hole, wherein the means include the edge of the cooling air hole being uneven or having a ridge with a sufficient height to prevent the particle from closing the cooling air hole, wherein the ridge has a form of a star stamped on the base material.

9. The base material as claimed in claim 8, wherein the base material is a part of a gas turbine.

10. The base material as claimed in claim 9, wherein the part of the gas turbine is a cast part or a sheet-metal part.

11. A base material with a cooling air hole, through which cooling air laded with particles flows during the operation of the cooling hole, wherein means which prevent the particles closing the cooling air holes are present at the cooling air hole, wherein the means includes a star-shaped cooling air hole.

12. The base material as claimed in claim 11, wherein the base material is a part of a gas turbine.

13. The base material as claimed in claim 12, wherein the part of the gas turbine is a cast part or a sheet-metal part.

14. A base material with a cooling air hole, through which cooling air laded with particles flows during the operation of the cooling hole, wherein means which prevent the particles closing the cooling air holes are present at the cooling air hole, wherein the means includes an ellipsoidal cooling air hole.

15. The base material as claimed in claim 14, wherein the base material is a part of a gas turbine.

16. The base material as claimed in claim 15, wherein the part of the gas turbine is a cast part or a sheet-metal part.

17. A base material with a cooling air hole, through which cooling air laded with particles flows during the operation of the cooling hole, wherein means which prevent the particles closing the cooling air hole are present at the cooling air hole, wherein the means includes a circular cooling air hole with lateral slots formed as a star-shaped cooling air hole, an extent of the lateral slots of the circular cooling air hole being limited so as to be separate from lateral slots of an adjacent cooling air hole.

18. The base material as claimed in claim 17, wherein the base material is a part of a gas turbine.

19. The base material as claimed in claim 18, wherein the part of the gas turbine is a cast part or a sheet-metal part.

* * * * *